(12) United States Patent  (10) Patent No.: US 8,854,792 B2
Timmons  (45) Date of Patent: Oct. 7, 2014

(54) LOW OPERATING TEMPERATURE HIGH VOLTAGE CONTACTOR

(71) Applicant: Adam Timmons, Birmingham, MI (US)

(72) Inventor: Adam Timmons, Birmingham, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 219 days.

(21) Appl. No.: 13/621,495

(22) Filed: Sep. 17, 2012

(65) Prior Publication Data

US 2014/0076705 A1   Mar. 20, 2014

(51) Int. Cl.
*H01G 7/00* (2006.01)
*H01G 5/00* (2006.01)

(52) U.S. Cl.
USPC .............................. 361/281; 361/277; 361/280

(58) Field of Classification Search
CPC .............. H01G 4/06; H01G 5/16; H01G 9/07
USPC .......................................... 361/277, 280, 281
See application file for complete search history.

(56) References Cited

U.S. PATENT DOCUMENTS 6,856,499 B2 *  2/2005  Stokes .......................... 361/277
7,307,827 B2 * 12/2007  Shimanouchi et al. ....... 361/278
8,588,439 B2 * 11/2013  Despesse ...................... 381/191

\* cited by examiner

*Primary Examiner* — Jayprakash N Gandhi
*Assistant Examiner* — Dion R Ferguson
(74) *Attorney, Agent, or Firm* — Ralph E Smith

(57) ABSTRACT

An electrical contactor for use in a high voltage bus utilizes two capacitor plates and a dielectric element movable in a gap between the plates under a charging voltage applied to the plates. The dielectric element is biased to a contactor off, or open, position by a biasing element, such as a spring. Once activated, the contactor remains closed under the influence of the charging voltage across the capacitor plates, yet does not draw a current during this state. The contactor may be released by a controllable discharge circuit placed across the capacitor plates.

5 Claims, 2 Drawing Sheets

LOW OPERATING TEMPERATURE HIGH VOLTAGE CONTACTOR

FIELD

The present disclosure relates to switches for connecting and disconnecting a power source to a load. More particularly, the disclosure concerns a contactor element for switching power to a high voltage bus.

BACKGROUND

Electric current in a high voltage (i.e., on the order of 350-400 volts) system is conventionally controllably switched on and off using high current switches, such as solenoid based contactors. The disadvantage of the solenoid contactor is the current required to maintain solenoid activation. A solenoid-based contactor heats up undesirably under this current draw condition. Such unwanted heat may have deleterious effects on the equipment with which the solenoid is housed. For example, conventional solenoid-based contactors in many electric vehicle high voltage battery systems are housed inside a housing containing temperature sensitive battery cells.

There is seen to be a need for a low operating temperature, or cool, high voltage contactor.

SUMMARY

In one aspect of the disclosure, an electrical contactor for use in a high voltage bus includes first and second capacitor elements facing each other across a gap. A dielectric element is arranged to move in the gap. A bias element is coupled to the dielectric element and urges the dielectric element toward a first position. A controllable voltage source is operative to place an activating voltage across the first and second capacitor elements thereby causing the dielectric element to move in the gap against the force of the bias element into a second position. First and second conductive contacts, one of which is coupled for movement with the dielectric element, are spaced apart at the first position of the dielectric element and are in abutting contact with each other at the second position of the dielectric element.

In another aspect of the disclosure, an electrical contactor includes first and second capacitor plates forming a plate gap therebetween. A dielectric element is arranged for movement in the plate gap. A conductive element is coupled to an extends through the dielectric element, the conductive element having a first end and a second end, the first end including first and second flexible elements capturing a bias spring therebetween, the bias spring separating the flexible elements causing the conductive element and the dielectric element to assume a first position. The second end of the conductive element includes a movable contact. A fixed contact comprising opposing contact surfaces defining a contact gap therebetween faces the movable contact of the conductive element. A voltage source is operable to apply a charging potential across the first and second capacitor plates, thereby causing the dielectric elements to move in the gap in opposition to the bias spring to move the movable contact into the contact gap in abutting engagement with the opposing contact surfaces.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2A shows the contactor in the off, or disconnected, state and FIG. 2B shows the contactor in the on, or connecting state.

DETAILED DESCRIPTION

The gist of the disclosure is to avoid problems with high current draw normally required to maintain switch closure in solenoid-based contactor switch elements in high voltage bus systems, such as found in electric vehicles. Such an exemplary system is shown in FIG. 1.

Figure 1:
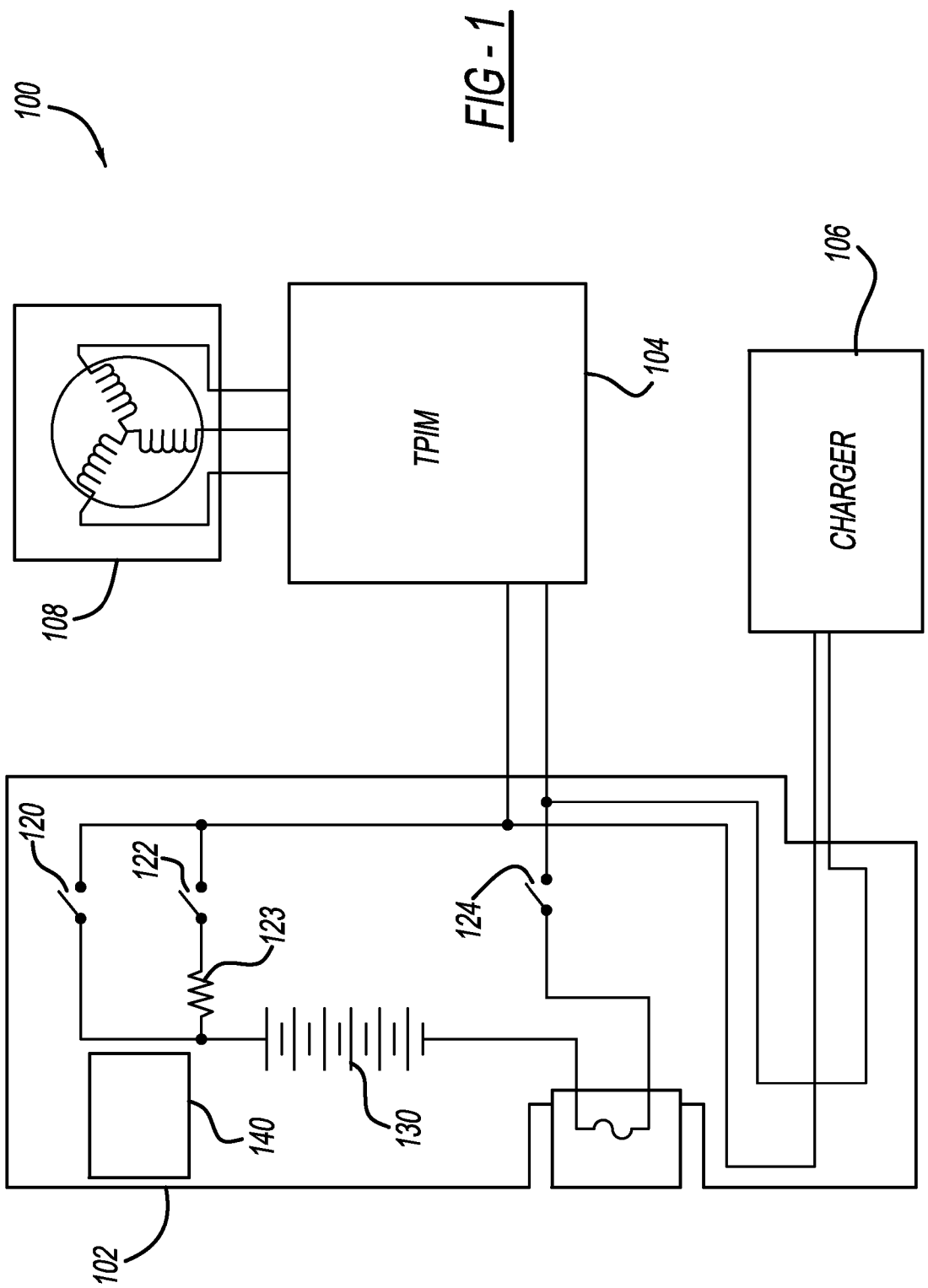
FIG. 1 is a block diagram of an electric vehicle high voltage battery and load demonstrating how the disclosed contactors are used.

With reference to FIG. 1, high voltage battery system 102 is coupled to a traction power inverter module 104, which is in turn coupled to an electric motor 108. Inverter 104 is of a conventional design which supplies three-phase AC voltage outputs to drive the coils of an electric motor.

Charger 106 is also coupled to the high voltage battery system 102.

Within system 102, contactors 120, 122 and 124 are used to connect and disconnect the voltage from battery 130 from the output bus leading to element 104. These contactors are controlled by a controller 140. The voltage available from battery 130 is "high"—i.e., on the order of 350-400 volts. Therefore, contactors 120, 122 and 124 must be capable of handling high current loads.

Figure 2A:
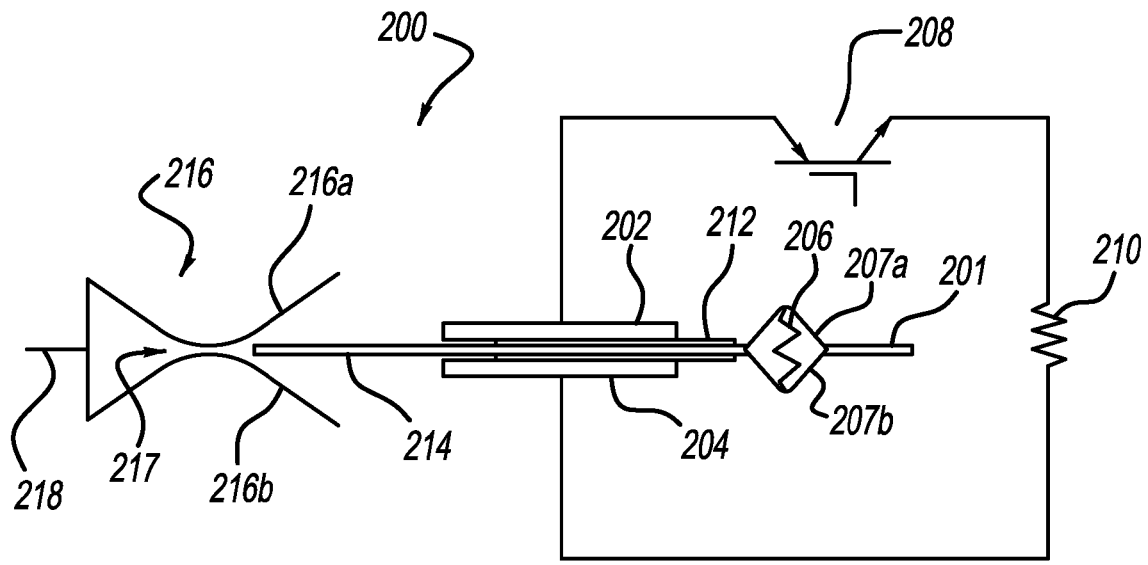
FIGS. 2A and 2B depict an exemplary contactor arrangement in accordance with the principles of the invention, where
Figure 2B:
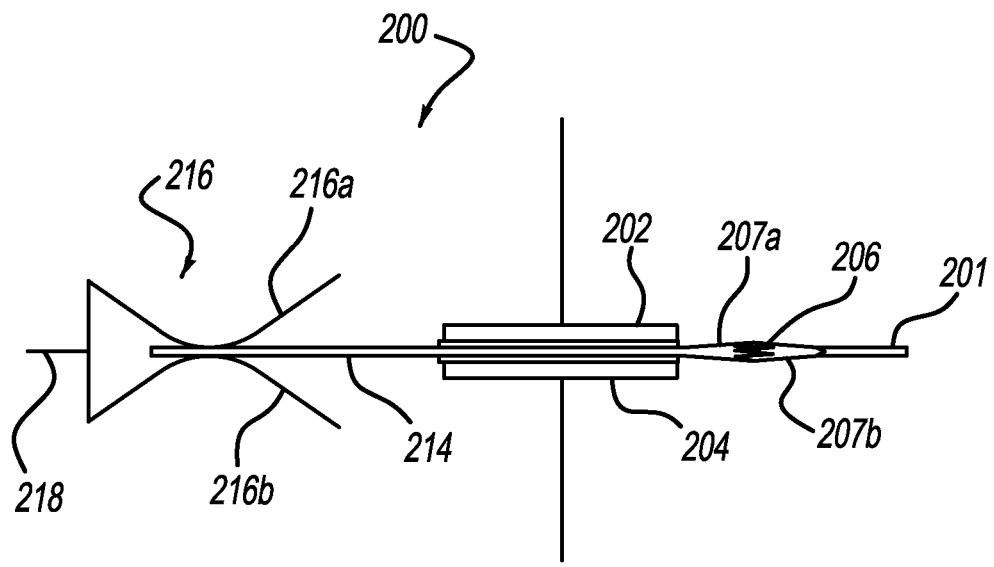

With reference to FIGS. 2A and 2B, an exemplary capacitor-based contactor is shown. Contactor 200 is shown in the open or nonconductive state in FIG. 2A and in the closed or conductive state in FIG. 2B.

In the closed state of FIG. 2B, current enters the contactor at end 201 of a conductive element and exits at terminal 218 on a fixed contact of the contactor. Abutting contact between the conductive element at its end 214 is made with fixed contact 216 by an end of element 214 entering a gap between plates 216a and 216b of the fixed contact to enter into an abutting relationship therewith.

With continued reference FIGS. 2A, 2B, capacitor-based contactor 200 includes first and second capacitor elements 202, 204, for example, plates, defining a gap therebetween. Dielectric element 212 is arranged for movement in the gap between plates 202 and 204.

A fixed end 201 of a conductive element, such as a rod, is attached to a support surface, not shown. A movable end or contact 214 of the conductive element is movable with a dielectric element 212, into which the conductive element is imbedded or otherwise attached.

Biasing element 206, such as a spring, captured between two flexible elements 207a and 207b formed in or as a part of the conductive element functions to hold the conductive element and its attached dielectric element in an off, or nonconductive, state shown in FIG. 2A.

Fixed electrically conductive contact 216 has opposed pliable surfaces 216a and 216b defining a gap 217 therebetween.

Gap 217 in the off state, shown in FIG. 2A, has a lateral dimension slightly smaller than a lateral dimension of the conductive element, which is forced between elements 216a and 216b in the on condition of FIG. 2B.

In operation, a controllable charging voltage (not shown), such as a DC battery in series with a control switch, is placed across plates 202 and 204, thereby causing dielectric element 212 to move in the interplate gap to the left, as seen from FIGS. 2A and 2B, to force element 214 into gap 217 to thereby establish abutting contact with both surfaces 216a and 216b of fixed contact 216. The charging voltage may be taken from a conventional 12 volt automotive battery, or, preferably, from the high voltage system of the vehicle. The charging voltage is applied via a control switch.

It will be understood that as long as the charging voltage is maintained across plates 202 and 204, contactor 200 will remain in the on or conductive state shown in FIG. 2B although unlike a solenoid-type contactor, no additional current is required to maintain the on or conductive state. A circuit for switching the contactor off, or to the open position, is shown in FIG. 2A. The turn-off circuit is comprised of a switching transistor 208 in series with a shorting transistor 210. During normal activation of contactor 200, transistor 208 is in the open or off state. Under conditions in which it is desired to turn contactor 200 back to the off state, transistor 208 is closed establishing a shorting path across plates 202 and 204 through current limiting resistor 210. Removal of the charging voltage across plates 202 and 204 will enable the force of the bias spring 206 to return dielectric element 212, along with movable portion 214 of the conductive element, to the position shown in FIG. 2A.

Alternatively, element 208 may be comprised of normally open contacts of an electromechanical relay held on by the vehicle's conventional 12 volt battery. If the 12 volt battery connection is lost, for example, as a result of a crash event severing a battery cable, the normally open or off element 208 closes to place resistor 210 across plates 202 and 204 to discharge the voltage across those plates.

It will be understood that the advantage of the disclosed contactor arrangement is that once the capacitor plates are charged, the contactor remains on, yet draws no current in the on state. This lowers the operating temperature of the contactor substantially when compared to an inductive solenoid-based contactor element.

What is claimed is:

1. An electrical contactor for use in a high voltage bus, the contactor comprising:

first and second capacitor elements facing each other across a gap;

a dielectric element arranged to move in the gap;

a bias element coupled to the dielectric element and urging the dielectric element toward a first position;

a controllable voltage source operative to place an activating voltage across the first and second capacitor elements thereby causing the dielectric element to move in the gap against the force of the bias element into a second position; and first and second conductive contacts, one of which is coupled for movement with the dielectric element, the first and second contacts spaced apart at the first position of the dielectric element and in abutting contact with each other at the second position of the dielectric element.

2. The contactor element of claim 1 further comprising a resistance element coupled via a switch across the first and second capacitor elements.

3. The contactor element of claim 1 wherein the bias element comprises a spring.

4. An electrical contactor comprising:

first and second capacitor plates forming a plate gap therebetween;

a dielectric element arranged for movement in the plate gap;

a conductive element coupled to and extending through the dielectric element, the conductive element having a first end and a second end, the first end including first and second flexible elements capturing a bias spring therebetween, the bias spring separating the flexible elements causing the conductive element and the dielectric element to assume a first position, the second end of the conductive element including a movable contact;

a fixed contact comprising opposing contact surfaces defining a contact gap therebetween; and a voltage source operable to apply a charging potential across the first and second capacitor plates, thereby causing the dielectric element to move in the plate gap in opposition to the bias spring to move the movable contact into the contact gap in abutting engagement with the opposing contact surfaces.

5. The electrical contactor of claim 4 further comprising means for selectively coupling a discharge resistor across the first and second capacitor plates.

* * * * *